United States Patent [19]

Watanabe et al.

[11] Patent Number: 5,397,186

[45] Date of Patent: Mar. 14, 1995

[54] BEARING STRUCTURE FOR ROTATING SHAFT

[75] Inventors: Takashi Watanabe; Yoshihito Otomo; Yoshiaki Aboshi; Hiroyuki Saito, all of Yamagata, Japan

[73] Assignee: Mitsumi Electric Co., Ltd., Japan

[21] Appl. No.: 188,408

[22] Filed: Jan. 24, 1994

[51] Int. Cl.⁶ .............................................. F16C 21/00
[52] U.S. Cl. .................................... 384/126; 384/537
[58] Field of Search ............... 384/126, 127, 128, 537, 384/519, 559, 585

[56] References Cited

U.S. PATENT DOCUMENTS

| | | | |
|---|---|---|---|
| 2,704,693 | 3/1955 | Schwan | 384/519 |
| 2,731,575 | 1/1956 | Hershberger | 384/537 X |
| 4,384,226 | 5/1983 | Sato et al. | 384/537 X |
| 4,859,086 | 8/1989 | Viscusi | 384/126 |
| 4,867,581 | 9/1989 | Schmidt et al. | 384/537 X |
| 5,143,459 | 9/1992 | Plutt | 384/537 |

*Primary Examiner*—Thomas R. Hannon
*Attorney, Agent, or Firm*—Whitham, Curtis, Whitham & McGinn

[57] ABSTRACT

A bearing structure for a rotating shaft wherein a frame through which a motor is mounted on a device body is press-worked; a bearing section for supporting the rotating shaft of the motor is formed into a body that is separate from the frame; a mounting hole for securing the bearing section to a motor mounting position of the frame is arranged; a shaft hole for supporting the rotating shaft of the motor is formed on one end side of the bearing section; a bearing housing into which a bearing is fitted is formed on the other end side thereof; and a socket joint portion to be press-fitted into the mounting hole of the frame is formed on an outer circumference on the one end side having the shaft hole of the bearing section is formed.

14 Claims, 1 Drawing Sheet

BEARING STRUCTURE FOR ROTATING SHAFT

BACKGROUND OF THE INVENTION

1. Field of the Invention

This invention relates to a bearing structure for a rotating shaft that rotates a floppy disk in an electronic device such as a personal computer and a word processor or the like.

2. Related Art

A disk table is usually fixed on a rotating shaft of an electronic device of this type to integrally rotate a floppy disk carried on the disk table. Therefore, precision of rotation free from unevenness and undesired movement is required for the rotating shaft.

Specifically, as shown in, e.g., FIG. 3, a conventional bearing structure is such that a frame 12 made by aluminum die-casting or the like and a bearing section 13 for supporting a rotating shaft 11 of a motor 10 are integrally formed and that a bearing 14 and a metal sleeve 15, both fitted into the bearing section 13, rotatably support the rotating shaft 11 of the motor 10. The motor 10 is secured to the frame 12 by a bracket 16, and a disk table 17 is disposed on the upper end of the rotating shaft 11.

However, in the above-mentioned conventional bearing structure for a rotating shaft, the bearing section and the frame which support the rotating shaft are integrally formed by aluminum die-casting or the like, and to prevent eccentricity and uneven rotation of the rotating shaft, high precision is required to machine the portions into which the bearing and the metal sleeve are fitted, which in turn elevates the material cost as well as the molding cost. In addition, the operation of assembling the bearing and the metal sleeve to the bearing section has not been performed in a subline.

SUMMARY OF THE INVENTION

The invention has been made to overcome the above problems associated with the conventional bearing structure. Accordingly, the object of the invention is to provide a bearing structure for a rotating shaft that can simplify the machining and assembling processes and thereby reduce the manufacturing cost by forming the bearing section for supporting the rotating shaft of the motor into a body that is separate from the frame.

To achieve the above object, the invention is applied to a bearing structure for a rotating shaft wherein a frame through which a motor is mounted on a device body is press-worked; a bearing section for supporting the rotating shaft of the motor is formed into a body that is separate from the frame; a mounting hole for securing the bearing section to a motor mounting position of the frame is arranged; a shaft hole for supporting the rotating shaft of the motor is formed on one end side of the bearing section; a bearing housing into which a bearing is fitted is formed on the other end side thereof; and a socket joint portion to be press-fitted into the mounting hole of the frame is formed on an outer circumference on the one end side having the shaft hole of the bearing section is formed.

Based on the above construction, the bearing structure for a rotating shaft of the invention is characterized as press-working the frame and forming the bearing section for supporting the rotating shaft of the motor into a body that is separate from the frame. Therefore, the material cost as well as the number of working steps can be curtailed. In addition, the bearing can be mounted on the frame after having been assembled to the bearing section in a subline.

DETAILED DESCRIPTION OF THE PREFERRED EMBODIMENT

An embodiment of the invention will now be described in detail with reference to the drawings.

Figure 1:
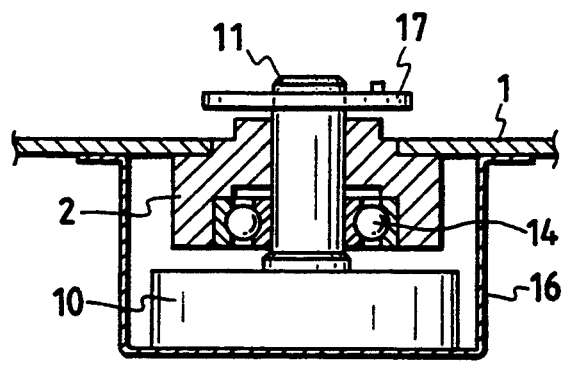
FIG. 1 is a sectional view showing a main portion of a bearing structure for a rotating shaft, which is an embodiment of the invention.
Figure 2:
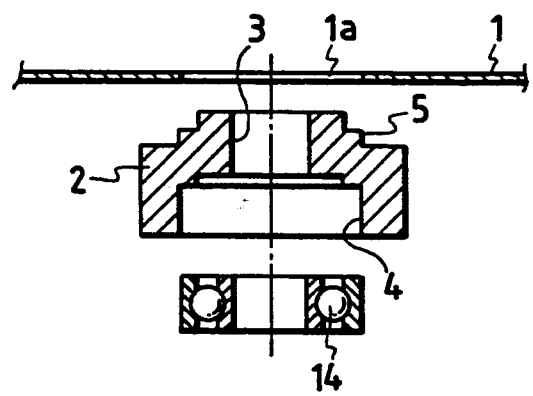
FIG. 2 is a sectional view of the main portion shown in FIG. 1 in exploded form.
Figure 3:
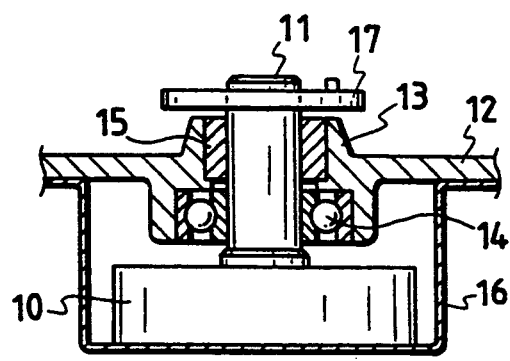
FIG. 3 is a sectional view showing a main portion of a conventional bearing structure for a rotating shaft.

FIG. 1 is a sectional view showing a main portion of a bearing structure for a rotating shaft, which is an embodiment of the invention; and FIG. 2 is a sectional view of the main portion shown in FIG. 1 in exploded form. In these figures, parts and components corresponding to those of the conventional structure will be described while designated by the same reference numerals.

A frame 1 to which to secure a motor 10 of a device body of the invention and a bearing section (e.g., a support member) 2 for supporting a rotating shaft 11 of the motor 10 are formed into separate pieces. The frame 1 is press-worked. At a position of the frame 1 at which to mount the motor 10 is a mounting hole 1a for securing the bearing section 2.

The bearing section 2 is cylindrical and made of a wear resistant metal or the like. On one end and in the middle of the bearing section 2 is a shaft hole 3 for supporting the rotating shaft 11 of the motor 10, whereas on the other end thereof is a bearing housing 4 for fitting a bearing 14. On an outer circumference on the one end having the shaft hole 3 of the bearing section 2 is a socket joint portion 5 that is to be press-fitted into the mounting hole 1a of the frame 1.

According to the thus constructed embodiment of the invention, the frame to which the motor of the device body is secured is subjected to press-working, and the mounting section of the bearing section can be assembled to the mounting hole of the frame after the bearing has been assembled to the bearing section in a subline since the bearing section for supporting the rotating shaft of the motor is formed into a body that is separate from the frame.

As described in the foregoing, the bearing structure for a rotating shaft of the invention is characterized as press-working the frame and forming the bearing section for supporting the rotating shaft of the motor into a body that is separate from the frame. Therefore, not only the material cost but also the number of working steps can be curtailed. In addition, the invention allows the bearing section to be secured to the frame after the bearing has been assembled to the bearing section in the subline, thereby contributing to mass production of bearing sections as well as to a significant reduction in their manufacturing cost.

What is claimed is:

1. A bearing structure comprising:
   a frame through which a motor having a rotating shaft, is mounted on, the frame being press-worked and including a mounting hole;

a support member for supporting the rotating shaft of the motor, said mounting hole for securing the support member to a motor mounting position of the frame, the support member including:
- a shaft hole for supporting the rotating shaft of the motor, the shaft hole being formed on a first end side of the support member;
- a bearing housing into which a bearing is fitted, the bearing housing being formed on a second end side of said support member; and
- a socket joint portion for press-fitting into the mounting hole of the frame, the socket joint portion being formed on an outer circumference on the first end side having the shaft hole of the support member.

2. A bearing structure for a rotating shaft as claimed in claim 1, wherein the support member is formed separately from the frame.

3. A bearing structure according to claim 1, wherein said support member comprises a cylindrical member.

4. A bearing structure according to claim 1, wherein said support member comprises a wear-resistant material.

5. A bearing structure comprising:
- a frame for mounting a motor having a rotating shaft, and having a mounting hole;
- a support structure for supporting the rotating shaft of the motor, said mounting hole for securing the support structure to the frame, the support structure including:
- a shaft hole for supporting the rotating shaft of the motor, the shaft hole being formed on a first end of the support structure;
- a bearing housing for accommodating a bearing and being formed on a second end of said support structure; and
- a joint for press-fitting into the mounting hole of the frame.

6. A bearing structure according to claim 5, wherein the joint is formed on a circumference on the first end of the support structure.

7. A bearing structure according to claim 6, wherein the support structure is formed separately from the frame.

8. A bearing structure according to claim 7, wherein said support structure comprises a cylindrical member.

9. A bearing structure according to claim 8, wherein said support structure comprises a wear-resistant material.

10. A bearing structure according to claim 5, wherein said frame comprises a press-worked structure.

11. A bearing structure according to claim 5, wherein the support structure is formed separately from the frame.

12. A bearing structure according to claim 5, wherein the support structure is formed separately from the frame.

13. A beating structure according to claim 5, wherein said support structure comprises a cylindrical member.

14. A bearing structure according to claim 5, wherein said support structure comprises a wear-resistant material.

* * * * *